FIP8102 OR 3,588,701

[redacted] 75 29E

X5226R

[11] 3,588,701

[72] Inventor Leona . Richardson
Freepc X5416Y X5183H
.........an
BS

[21] Appl. No. 758,560
[22] Filed Sept. 9, 1968
[45] Patented June 28, 1971
[73] Assignee Kahn Research Laboratories, Inc.
Freeport, Long Island, N.Y.
Continuation-in-part of application Ser. No. 500,005, Oct. 21, 1965, now Patent No. 3,401,341, dated Sept. 10, 1968.

[54] COMMUNICATIONS SYSTEM WITH MODULATION MODE OF RECEIVED SIGNAL AUTOMATICALLY CONTROLLING MODULATION MODE OF ASSOCIATED TRANSMITTER
10 Claims, 8 Drawing Figs.

[52] U.S. Cl. .......... 325/15, 325/21, 325/103
[51] Int. Cl. .......... H04b 1/38
[50] Field of Search .......... 325/15, 21, 45, 49, 50, 137, 138, 145, 315, 316, 18, 103

[56] References Cited
UNITED STATES PATENTS 2,811,638 10/1957 Regnier .......... 325/316

ABSTRACT: Communications system involving plural receive/transmit stations, at least some of which are equipped to receive and transmit signals in various signal modulation modes, with at least one station comprising receiver means automatically sensing the modulation mode of a given received transmission and responsively establishing and maintaining the operating mode of the associated transmitter to transmit in the modulation mode sensed by the receiver. The receiver is also provided with memory circuitry to maintain the operating mode of the transmitter in the modulation mode last sensed by the receiver until an effective signal having another modulation mode is received. Squelch circuitry is also provided to disable the receiver output in the situation where the signal-to-noise ratio of the received signal is below a predetermined value. Various types of typical receive/transmit systems are presented, involving differentiation as between amplitude modulation type and single sideband modulation type received signals, between high stability amplitude modulation and high stability single sideband modulation received signals, between amplitude modulation, upper single sideband, and lower single sideband types of received signals, between amplitude modulation and frequency modulation types of received signals, and between single sideband and frequency modulation types of received signals.

INVENTOR
LEONARD R. KAHN
BY
Graybeal, Cole & Barnard
ATTORNEYS

INVENTOR
LEONARD R. KAHN

BY
Graybeal, Cole & Barnard
ATTORNEYS

Fig. 5. AM/FM RECEIVER
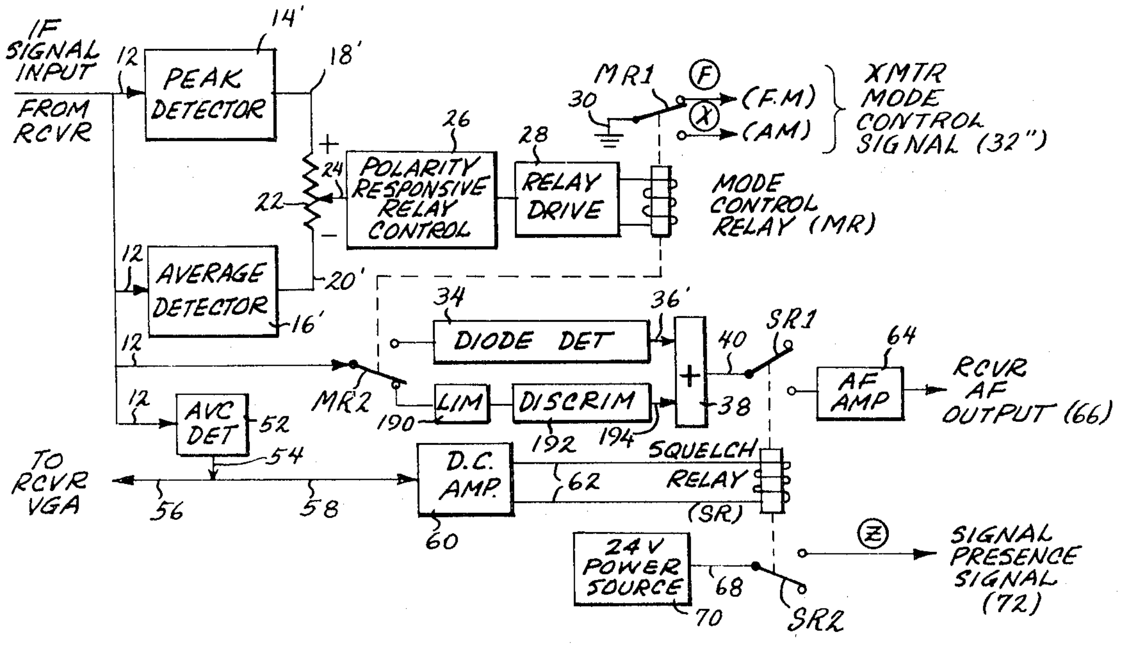
Fig. 6. SSB/FM RECEIVER
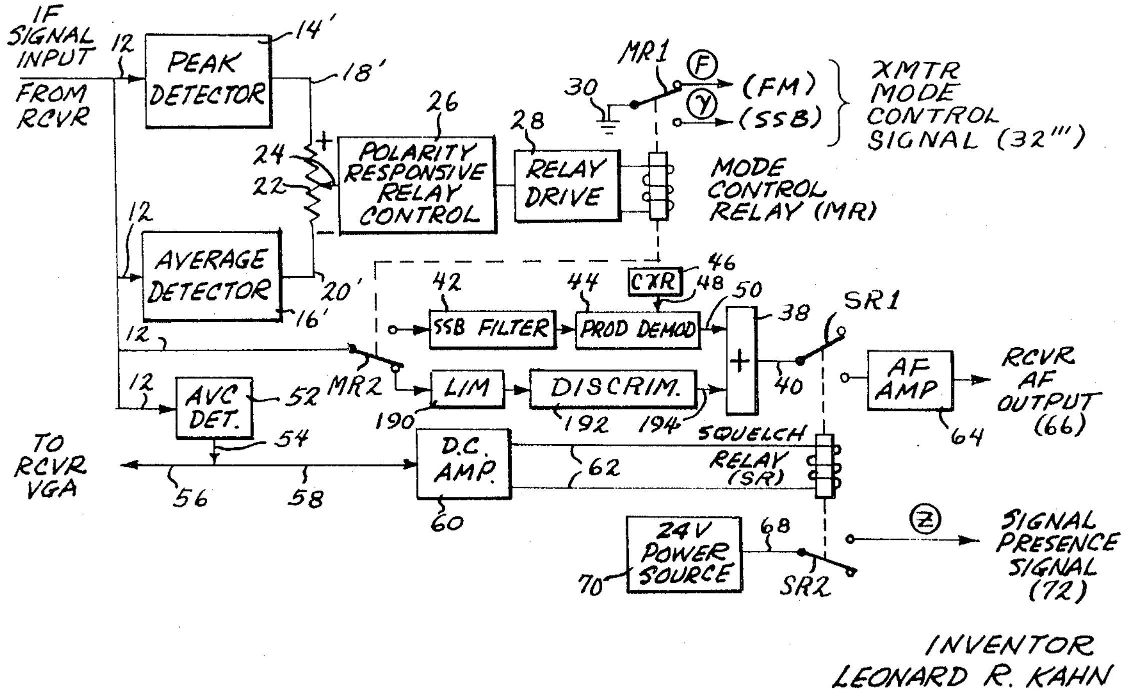
INVENTOR
LEONARD R. KAHN
BY
Graybeal, Cole & Barnard
ATTORNEYS Patented June 28, 1971 3,588,701

4 Sheets-Sheet 4

INVENTOR
LEONARD R. KAHN
BY
Darby, Cole & Barnard
ATTORNEYS

COMMUNICATIONS SYSTEM WITH MODULATION MODE OF RECEIVED SIGNAL AUTOMATICALLY CONTROLLING MODULATION MODE OF ASSOCIATED TRANSMITTER

CROSS REFERENCES TO RELATED APPLICATION

This application is a continuation-in-part of application Ser. No. 500,005, entitled Automatic Switching of Receiver Mode Responsive to Characteristic of Received Signal, filed Oct. 21, 1965, now U.S. Pat. No. 3,401,341, issued Sept. 10, 1968.

BACKGROUND OF THE INVENTION

1. Field of the Invention

This invention relates to communications systems involving plural receive/transmit stations with at least one such station being equipped to receive and transmit signals of diverse operating modes (e.g. either an amplitude modulation signal or a single sideband signal, for example). The improvements of the invention include circuitry in the receiver means for automatically sensing the modulation mode of a received signal and responsively controlling the detection circuitry of the receiver means to be compatible with the modulation mode of the received signal, and to also generate a transmitter control signal responsive to the modulation characteristic of the received signal, which transmitter control signal is employed to establish a compatible operating mode in the associated transmitter means. Memory circuitry is also provided for maintaining the operating mode of the receiver detection means and the associated transmitter means in the operating mode conforming to the modulation mode of the last received signal. Squelch control circuitry is also provided to render the receive/transmit circuitry responsive only in the instance of adequate signal presence, i.e. a receive signal of at least a predetermined signal-to-noise ratio.

2. Description of the Prior Art

It has become common practice in radio and like communications systems involving plural fixed and/or mobile stations to equip at least the control station(s) with receiver and transmitter equipments having the capability of receiving and transmitting signals with various types of modulation, e.g. amplitude modulation or single sideband modulation, for example. Conventionally, these stations are manually controlled, i.e. an operator observes the modulation mode of a given received signal and by manually operable switch means activates the compatible detection circuits of the receiver means and activates the associated transmitter means so that the responding transmission has the same modulation mode. However, manually controlled switching to conform the receiver and the transmitter to the desired modulation mode requires that the equipment operator continually monitor the equipment and subjectively perform the appropriate switching changes, with consequent operational delay and risk of operator error.

My aforesaid U.S. Pat. No. 3,401,341 discloses and claims means for automatic switching of a receiver in such a system to provide automatic sensing of the modulation mode of the received signal and automatic detection thereof. However, such receiver automatic switching can still require the operator to conform the associated transmitter means so that operational delay and risk of operator error are still encountered with respect to the responding transmission. The circuitry presented by said U.S. Pat. No. 3,401,341 also does not provide any means for automatically maintaining the detection mode of the receiver compatible with the last received signal, which can be an important operational consideration in the situation of transient signal fade, for example, and further does not provide circuitry insuring that the receiver means is insensitive to impulse noise energy, i.e. effects detection circuitry control only in the instance of the receive signal having an adequate signal-to-noise ratio.

SUMMARY OF THE INVENTION

To overcome the deficiencies incident to subjective operator control of the receiver and/or transmitter circuitry to conform the station operation to the modulation mode of a given received signal, as well as to overcome the operational problem incident to signal fade and noise energy, the improvements of the present invention provide receiver circuitry automatically sensing the modulation mode of the received signal and conjunctively sensing adequate signal presence, and from these sensed characteristics of the received signal automatically controlling the detection circuits of the receiver to detect the received signal and provide audio output in a manner compatible with the modulation mode of the received signal, as well as providing automatically a transmitter mode control signal responsive to both receive signal modulation mode and received signal strength so that the responding signal transmission has the same modulating mode as the received signal. It is a further object and feature of the present invention to provide receive/transmit equipments which automatically respond to the modulation mode of a given received signal and which demonstrate typical circuitry by which the receiver/transmitter means can sense and respond to signals of diverse modulation modes, typical systems in this respect involving the differentiation between amplitude modulation and single sideband modulation modes FIGS. 1A, 1B, 2 and 7), between amplitude modulation and single sideband modulation modes in a system characterized by high frequency stability (FIG. 3), between amplitude modulation, upper single sideband modulation, and lower single sideband modulation modes (FIG. 4), between amplitude modulation and frequency modulation modes (FIG. 5), and between single sideband modulation and frequency modulation modes (FIG. 6).

BRIEF DESCRIPTION OF THE DRAWINGS

FIG. 5 is a diagrammatic/schematic presentation of a further modified form of receiver characteristic of the present invention, of a type designed to differentiate between received signals of the amplitude modulation type and received signals of the frequency modulation type;

FIG. 6 is a diagrammatic/schematic presentation of a still further modified form of receiver characteristic of the present invention, wherein the receiver senses and differentiates between received signals having modulation modes of the single sideband modulation type and the frequency modulation type.

DESCRIPTION OF THE PREFERRED EMBODIMENTS

Figures 1A, 1B:
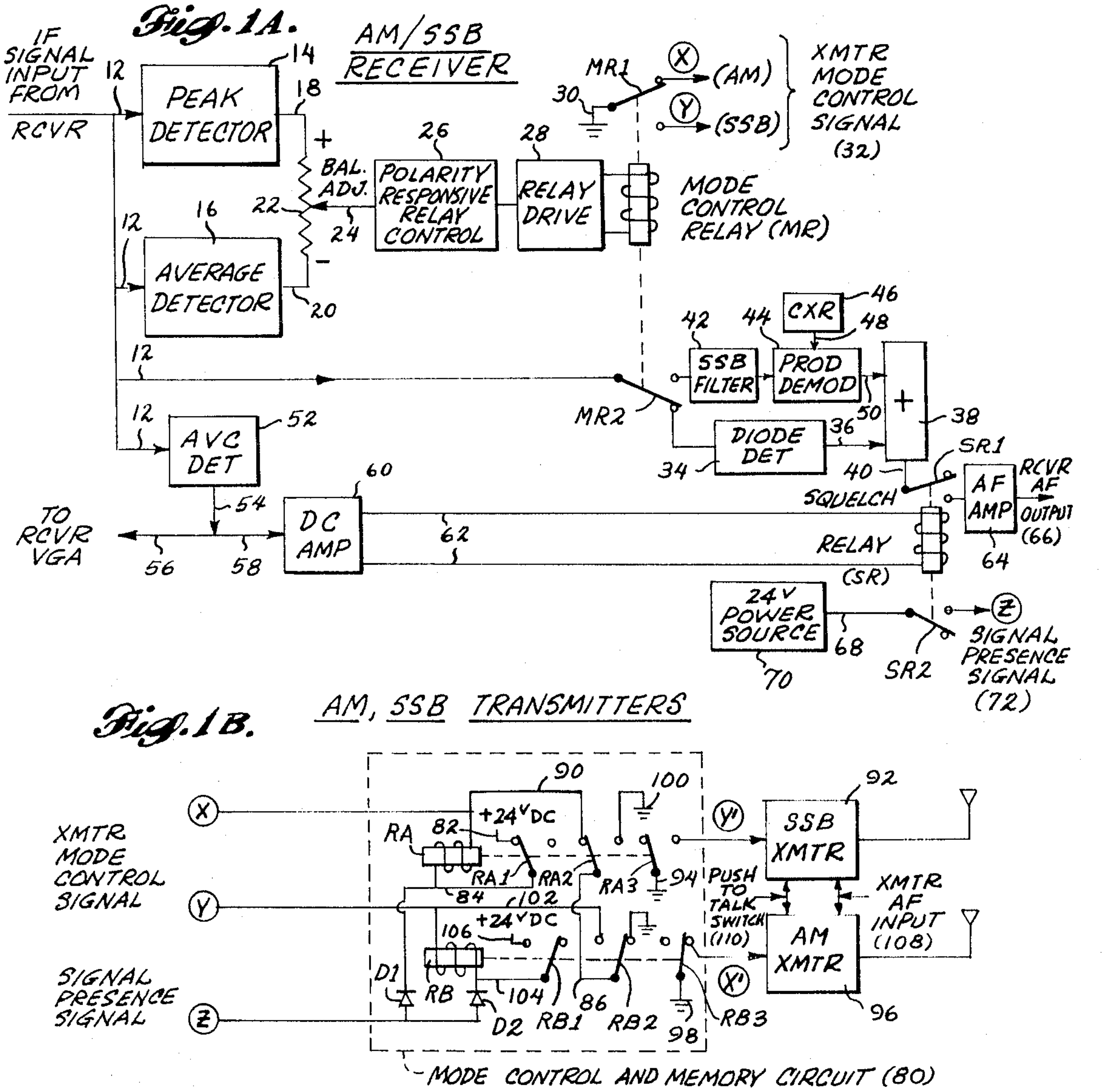
FIGS. 1A and 1B are respective block/schematic drawings of an amplitude modulation, single sideband modulation (AM/SSB) receiver, and associated AM, SSB transmitters, incorporating the modulation mode sensing, squelch control, memory circuit, and transmitter modulation mode control circuitry characteristic of the present invention.

FIGS. 1A and 1B present a typical circuit arrangement for practice of the present invention in the circumstance where the station receiver is to differentiate between an amplitude modulation type received signal and a single sideband modulation type received signal, and either an amplitude modulation type transmitter or a single sideband modulation type transmitter is employed to respond to the receive signal. As shown in FIG. 1A, a signal input 12, representative of the incoming signal energy and derived from the IF section (not shown) of the receiver in a manner conventional per se, is applied to a peak detector 14 and an average detector 16. The detectors 14, 16 are suitably of the diode type, each conventional per se, and typical detail with respect thereto can be as shown in my aforementioned U.S. Pat. No. 3,401,341. Peak detector 14 develops a positive voltage at output 18, and average detector 16 develops a negative voltage at output 20. Since a single sideband modulated signal has a relatively high crest or peak factor, giving a relatively high peak-to-average voltage ratio as compared with an amplitude modulated signal, in the situation where the signal input 12 has a single sideband modulation mode, the peak detector output 18 is dominant as compared with the average detector output 20. Conversely, in the situation where the input signal 12 has an amplitude modulation mode, the average detector output 20 is dominant. This detector output correlation pertains even when the peaks of the amplitude modulated signal are quantitatively larger than the peaks of the single sideband modulated signal, since the average voltage of the amplitude modulated signal is proportionately much higher than the average voltage of the single sideband modulated signal.

The respective detector outputs 18, 20 are applied to a comparison circuit (in the circuit illustrated simply a potentiometer 22), the variable tap 24 of which is adjustable to balance the circuit so that when the peak detector output 18 is dominant, the control voltage input to polarity responsive relay control 26 is positive, and when the average detector output 20 is dominant, the control voltage input to polarity responsive relay control 26 is negative. Polarity responsive relay control 26 in turn controls relay drive means 28 to establish mode control relay MR in a deenergized condition (as shown in FIG. 1A) when the average detector output 20 is dominant and in an energized condition when peak detector output 18 is dominant. The modulation mode of the signal input 12 sensed by the detectors 14, 16, thus results in a responsive deenergized or energized condition of the mode control relay MR.

In FIG. 1A, mode control relay MR is provided with two contacts, respectively designated MR1 and MR2. Contact MR1 functions to connect ground point 30 to either AM transmitter control line X or SSB transmitter control line Y, thus providing what may be termed a transmitter mode control signal output 32, the utilization of which is developed in the following discussion of FIG. 1B.

Mode control relay contact MR2 functions in its deenergized position (as shown in FIG. 1A) to apply a portion of the signal input 12 to diode detector 34 for detection of the amplitude modulation component of the input signal, the detector output 36 being in turn applied to a summation circuit 38, the audio output 40 from which is applied to contact SR1 of squelch relay SR. Correspondingly, mode control relay contact MR2 in its energized position applies a portion of the input signal 12 to single sideband detection means of a type conventional per se, including single sideband filter 42, product demodulator 44 (with associated conventional local carrier oscillator 46 input 48), with the audio output 50 from product demodulator 44 being applied to summation circuit 38 in this operation mode. It is an important feature of the receiver circuit shown in FIG. 1A that the circuit incorporates so-called squelch control means so that the receiver is nonresponsive to impulse noise or the like, which in many situations has a relatively high peak or crest factor and might otherwise yield receiver output even though a received signal of adequate signal-to-noise ratio is not present. This squelch control circuit, which in general employs components conventional per se, includes an AVC (automatic volume control) detector 52 providing a negative feedback control voltage output 54 which is applied to the receiver IF stages (not shown) in a manner conventional per se, as indicated at 56, and which is also applied as an input 58 to DC amplifier 60. DC amplifier 60 senses signal-to-noise ratio of the received signal and upon adequate signal presence provides an energizing output 62 to squelch relay SR. Upon energization of the relay SR, its contact SR1 applies the audio output 40 from summation circuit 38 to audio frequency amplifier means 64, which in turn provides the receiver AF output 66 to drive an appropriate output utilization means (not shown), such as a loudspeaker or the like. A second contact SR2 of squelch relay SR receives a voltage input 68 from a suitable DC (e.g. 24 volt) power source 70 and applies such DC voltage to signal output line Z, which voltage can also be termed a signal presence signal 72 in that the control voltage is present at such output line Z only in the instance of adequate signal presence, i.e. a received signal of adequate signal-to-noise ratio.

The transmitter mode control signal 32 collectively provided by output lines X and Y, and the signal presence signal 72 appearing at output line Z, are typically employed in the manner shown in FIG. 1B to activate either AM transmitter means or SSB transmitter means, as dictated by the modulation mode of the received signal 12, and to also maintain the operating mode of the transmitter means the same as the modulation mode of the last effective signal received. To accomplish these purposes, FIG. 1B presents what is generally termed a mode control and memory circuit 80, the manner of operation of which is as follows. Assuming an operating condition with adequate signal presence, line Z is established at 24 volts DC (from power source 70), and assuming that the signal being received is characterized by an amplitude modulation mode, line X is grounded (through contact MR1 to ground point 30) and line Y is ungrounded. In this circumstance, the DC voltage from line Z passes through a first diode D1 and energizes relay RA.

In the situation that relay RA of the mode control and memory circuit is energized (as shown in FIG. 1B), the companion relay RB remains deenergized because, notwithstanding its connection to the DC power source 70 and line Z through diode D2, there is no ground return for this circuit since line Y is ungrounded (by reason of the engagement of contact MR1 and line X).

Contact RA1 of relay RA functions as an interlock contact, providing a parallel DC energization voltage for the relay RA from voltage source 82 through line 84, and thus maintains the 24 volt supply for the relay RA even should there be an interruption of the 24 volt power supply at line Z, as can occur in the event of signal fade or signal cessation. Relay contact RA2 is also an interlock contact for maintaining energization of relay RA, by reason of its connection through line 86 and relay contact RB2 to ground point 88 and connection through line 90 to the ground side of RA1. Relay contact RA3 is the control contact of relay RA and is open circuit in the instance of relay RA energization, so that in this operating condition control line Y' to the single sideband transmitter 92 is open, i.e. has no connection to ground point 94. However, in this operating condition, the corresponding control relay contact RB3 of relay RB is in its deenergized position and in such position connects control line X' of AM transmitter 96 to ground point 98. Because of the interlocking nature of relay contacts RA1 and RA2, this transmitter control condition with AM transmitter 96 energized and with SSB transmitter 92 deenergized is initiated upon concurrence of the signal presence signal at line Z and upon the grounding of line X, and this condition is maintained until such time as there is a concurrence of a signal presence signal voltage at line Z and a grounding of line Y, by reason of the detector circuitry and squelch control circuitry sensing an effective input signal with a single sideband modulation mode. Upon this latter occurrence, relay RB energizes by current flow from line Z through diode D2 to the grounded line Y. With line X having become ungrounded by shift of contact MR1, and with shift of contact RB2 interrupting the ground circuit from ground point 88 to the ground side of relay RA, relay RA deenergizes, whereupon a ground interlock circuit for relay RB is established from ground point 100 through contact RA2, line 86, contact RB2 and line 102, and a voltage interlock circuit is established for relay RB by reason of connection of line 104 to voltage source 106 through contact RB1. Thus, also, contact RB3 is established in its energized position, which interrupts the connection of AM transmitter control line X' with ground point 98, and the establishment of relay RA in its deenergized condition moves its contact RA3 to connect SSB transmitter control line Y' with ground point 94, thus placing single sideband transmitter 92 in its energized condition. This control condition, with SSB transmitter 92 energized and AM transmitter 96 deenergized, continues until such time as line X is again grounded and line Z is concurrently supplied voltage from power source 70, i.e. until an amplitude modulation mode signal of effective signal strength is received.

As will be readily understood, each of the transmitters 92, 96 receives an AF input 108 and is suitably operator controlled as by push to talk switch means 110, in a manner conventional per se.

Figure 2:
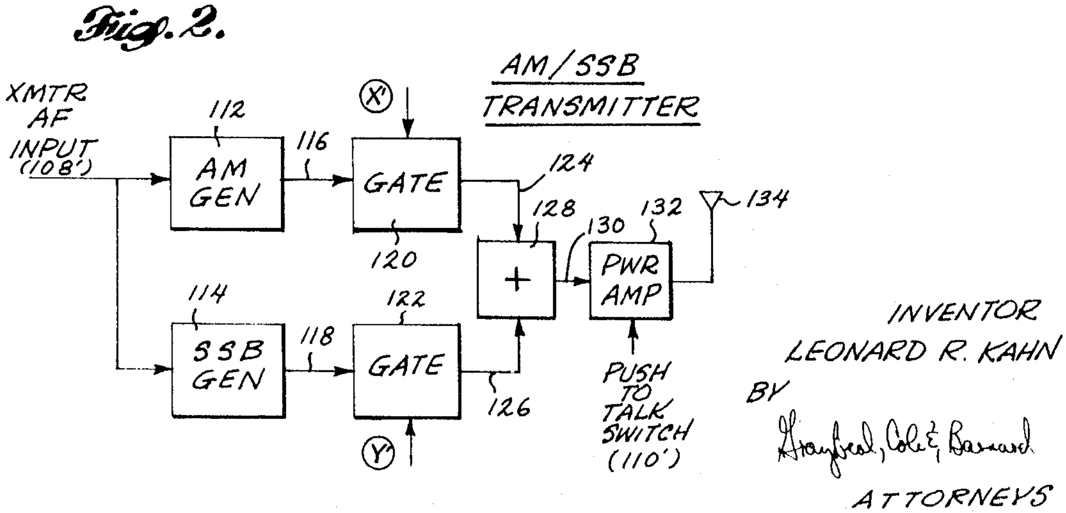
FIG. 2 is a diagrammatic presentation of a modification of the system shown in FIGS. 1A and 1B, wherein a single AM/SSB type of transmitter is employed to generate the responding transmission.

FIG. 2 illustrates an optional modification of the system shown in FIGS. 1A and 1B, with a single AM/SSB-type transmitter being employed in lieu of the separate transmitters 92, 96. In this modification, the transmitter AF input 108' is fed to an AM generator 112 and single sideband generator 114, the respective outputs 116, 118 from which are in turn passed to respective gates 120, 122, with one or the other of gated outputs 124, 126 going to the summation circuit 128, depending on which of respective control lines X', Y' is grounded (FIG. 1B). The generator output 130 thus selected is fed to power amplifier means 132 and thence to antenna means 134 under operator control as by push to talk switch means 110', in a manner conventional per se.

In the following discussion and consideration of the various receiver modifications presented in FIGS. 3—7 as further typical embodiments of the present invention, it will be understood that like component designations refer to like components in FIG. A, with similar components bearing prime designations as compared with the corresponding components in FIG. 1A, and that in each instance the modified form of receiver is operated in conjunction with mode control and memory circuitry as shown in FIG. 1B, with transmitter means such as shown in FIG. 1B or in FIG. 2 being automatically controlled as to transmission mode responsive to the mode of the signal being received or last received by the receiver, it being of course understood with respect to the nature of the transmitter means that the respective transmitter means employed are characterized by the same modulation modes as found in the various received signal modulation modes sensed by the associated receiver.

Figure 3:
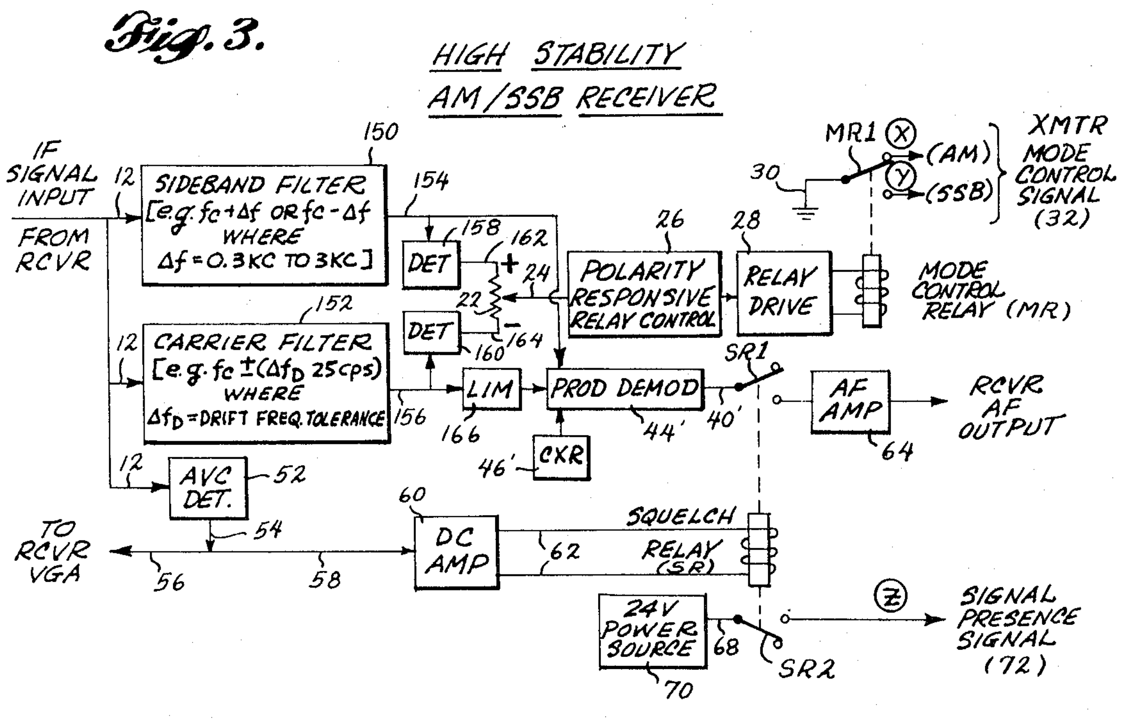
FIG. 3 is a diagrammatic/schematic showing of a form of receiver employing the modulation mode circuitry of the present invention, specifically designed for use in a communications system of the type wherein the transmitted carrier wave has high frequency stability (e.g. a carrier frequency deviation or a drift frequency tolerance of ±25 c.p.s., for example), and wherein the detection of the received signal is by product demodulator means whether a given received signal is of the amplitude modulation type or of the single sideband type.

FIG. 3 presents a modified form of receiver, designed specifically for optimized operation of the type of communications system of relatively recent evolution wherein a carrier of high frequency stability (e.g. a drift frequency tolerance of ±25 c.p.s.) is employed. Negligible carrier frequency shift permits detection of the received signal by product demodulator means irrespective of whether the signal has an amplitude modulation mode or a single sideband modulation mode. In this instance, the signal input 12 is fed to a single sideband filter 150 and a carrier filter 152, providing respective outputs 154, 156 to respective detectors 158, 160, the outputs 162, 164 from which are respectively positive and negative across the comparison potentiometer 22. When the received signal is single sideband in character, the principal energy of the received signal is in the sideband filter pass band and there is relatively little energy at the carrier frequency, and the energy in sideband filter output 154 and thus detector output 162 predominates as compared with the energy in carrier filter output 156 and its associated detector output 164, producing a relatively positive signal in the input 24 to polarity responsive relay control 26. Conversely, when the received signal is amplitude modulated in character, the carrier energy predominates as compared with the sideband energy and the input 24 to the polarity responsive relay control 26 is relatively negative. The modulation mode sensing circuitry shown in FIG. 3 thus differentiates between single sideband modulation and amplitude modulation modes and effects like control of mode control relay MR to respectively ground either control line X or control line Y and thus provide the transmitter mode control signal 32. However, in the FIG. 3 circuit, since product demodulation is employed to detect the signal modulation in the event of either single sideband modulation or amplitude modulation, the FIG. 3 circuit employs only product demodulator 46', receiving as inputs the output 154 from sideband filter 150 and the output 156 from carrier filter 152 through limiter 166 to realize the detected audio output 40' applied to contact SR1 of squelch relay SR. As will also be apparent in FIG. 3, the squelch control circuitry employed in this receiver to realize variable gain (VGA) control signal 56 and to develop the signal presence signal 72 at line Z is the same as shown in FIG. 1A.

Figure 4:
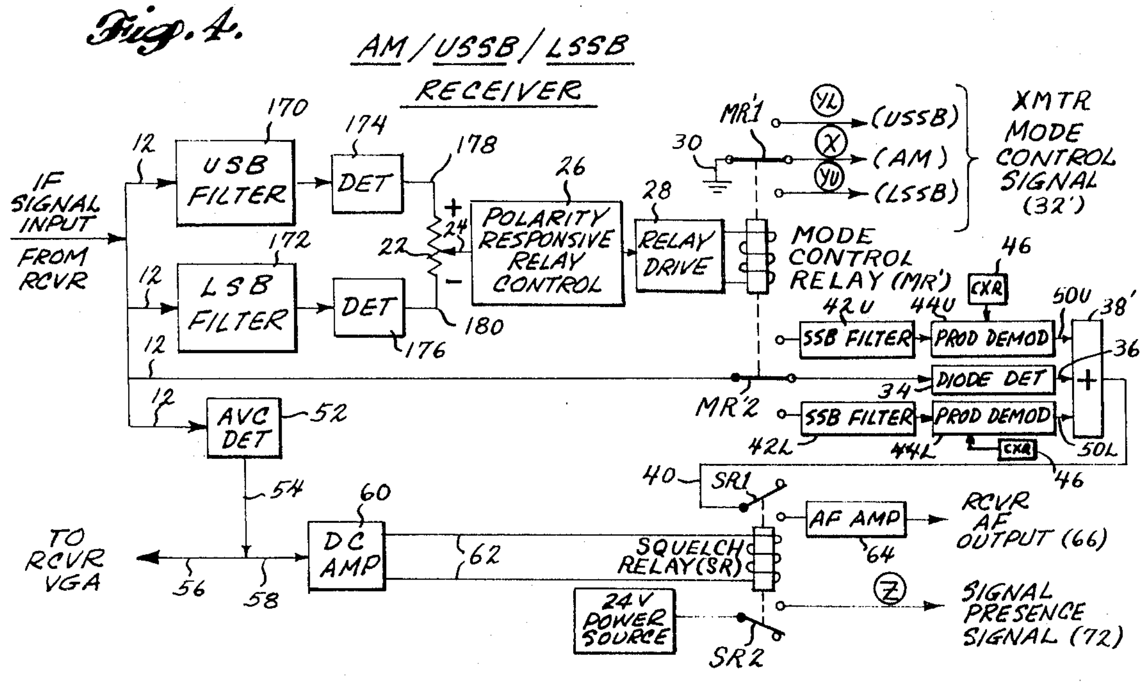
FIG. 4 is a diagrammatic/schematic presentation of a further modified form of receiver characteristic of the present invention, wherein the modulation mode sensing circuitry can differentiate among an amplitude modulation type of transmission, an upper single sideband type of transmission, and a lower single sideband type of transmission.

FIG. 4 illustrates a further modified form of receiver embodying the principles of the present invention, and having the capability of sensing an amplitude modulation type of received signal and also upper single sideband and lower single sideband types of modulation of the received signal. In this instance, the signal input 12 is applied to respective upper sideband filter 170 and lower sideband filter 172, thence through respective detectors 174, 176 to the comparison potentiometer 22, the variable tapped output from which appears as input 24 to polarity responsive relay control 26, in turn controlling relay drive 28 for mode control relay MR', which relay in this instance has control contacts MR'1 and MR'2 of the three position type. As will be evident, if the incoming signal has an amplitude modulation mode the respective outputs 178, 180 from detectors 174, 176 are of equal and opposite value so that the control voltage input to the polarity responsive relay control 26 is essentially zero. Under this control condition, the relay drive 28 establishes each of mode control relay contacts MR'1 and Mr'2 in its intermediate position, as shown in FIG. 4. In the circumstance when the incoming signal has an upper single sideband modulation mode, the energy appearing at detector output 178 predominates and the control signal at input 24 to relay control 26 is relatively positive and relay drive 28 energizes mode control relay MR' to place each of respective contacts MR'1 and MR'2 in its corresponding first energized position. Conversely, when the incoming signal is characterized by lower single sideband modulation, the energy in detector output 180 predominates, the control input to relay control 26 is relatively negative, and relay drive 28 energizes mode control relay MR' to place each of respective relay contacts MR'1 and MR'2 in its second energized position. To realize the transmitter mode control signal 32', relay contact MR'1 in its central or AM position grounds line X to ground point 30, in its first energized position grounds line YU to ground point 30, and in its second energized position grounds line YL to ground point 30. Corresponding control of the signal detection circuitry is effected by relay contact MR'2, which applies the input signal 12 to diode detector 34 in its AM or deenergized position, to upper single sideband filter 42U and product demodulator 44U in its first energized position, and to lower sideband filter 42L and its associated product demodulator 44L in its second energized position, with the selected detection channel providing a respective audio output 36, 50U or 50L to summation circuit 38′, the output 40 from which appears as receiver AF output 66 when squelch relay contact SR1 is in its energized position. As in FIG. 3, the squelch control and signal presence signal generating circuitry are the same as in FIG. 1A. It will be understood that the mode control and memory circuitry and transmitter means employed with the receiver circuitry shown in FIG. 4 involves three holding circuits and three transmission modes, rather than two, and that the control and memory circuit as well as the transmitter control outputs shown readily can be extrapolated to a three transmission mode system by application of routine circuit design principles.

FIG. 5 presents another receiver form typifying the present invention, wherein the receiver differentiates between received signals having an amplitude modulation mode and received signals having a frequency modulation mode. In this instance the modulation mode sensing takes advantage of the fact that an amplitude modulation signal has a higher peak-to-average characteristic than has an essentially constant amplitude frequency modulation type signal. Thus, in FIG. 5, the input signal 12 is applied to a peak detector 14′ and an average detector 16′ to generate respective outputs 18′, 20′ to comparison circuit 22 from which is derived an input 24 to polarity responsive relay control 26, which in turn controls the relay drive 28 and its mode control relay MR. However, in the FIG. 5 circuit, when the incoming signal 12 has an amplitude modulation mode, the output 18′ from peak detector 14′ predominates as compared with the output 20′ from the average detector 16′, and conversely when the incoming signal is of the frequency modulation mode, the average detector output 20′ predominates, with the result that mode control relay MR in the FIG. 5 circuit has a deenergized condition corresponding to the received signal having a frequency modulation mode and an energized condition corresponding to the incoming signal having an amplitude modulation mode. Consistent with this manner of operation, mode control relay contact MR1 connects ground point 30 to transmitter mode control line F in its deenergized position, and to transmitter control line X in its energized position to provide the transmitter mode control signal 32″. The detection circuit of the FIG. 5 receiver which is compatible with the modulation mode of the receive signal is likewise selected by relay contact MR2, which in its deenergized position applies a portion of the incoming signal 12 to limiter 190 and discriminator 192 to realize the audio output 194 from the FM signal, and in the energized position of relay contact MR2 the input signal 12 is applied to the diode detector 34′ to realize audio output 36′ to the summation circuit 38, whose output 40 is then applied to squelch relay contact SR1. Again, in FIG. 5, the final audio output stages and the squelch control and signal presence signal generating circuitry are the same as found in the earlier discussed receiver circuits.

FIG. 6 shows a still further modified form of receiver, which in this instance differentiates between received signals of the single sideband type and received signals of the frequency modulation type. This circuit is in all respects like the circuit shown and discussed in connection with FIG. 5 except in the generation of transmitter mode control signal 32‴ to the extent that the energized position of mode control relay contact MR1 provides connection of line Y (rather than line X of FIG. 5) to ground point 30, and except that mode control relay contact MR2 in its energized position applies a portion of the incoming signal 12 to the detection channel comprising sideband filter 42 and product demodulator 44, consistent with the single sideband nature of the signal received under this mode of operation.

Figure 7:
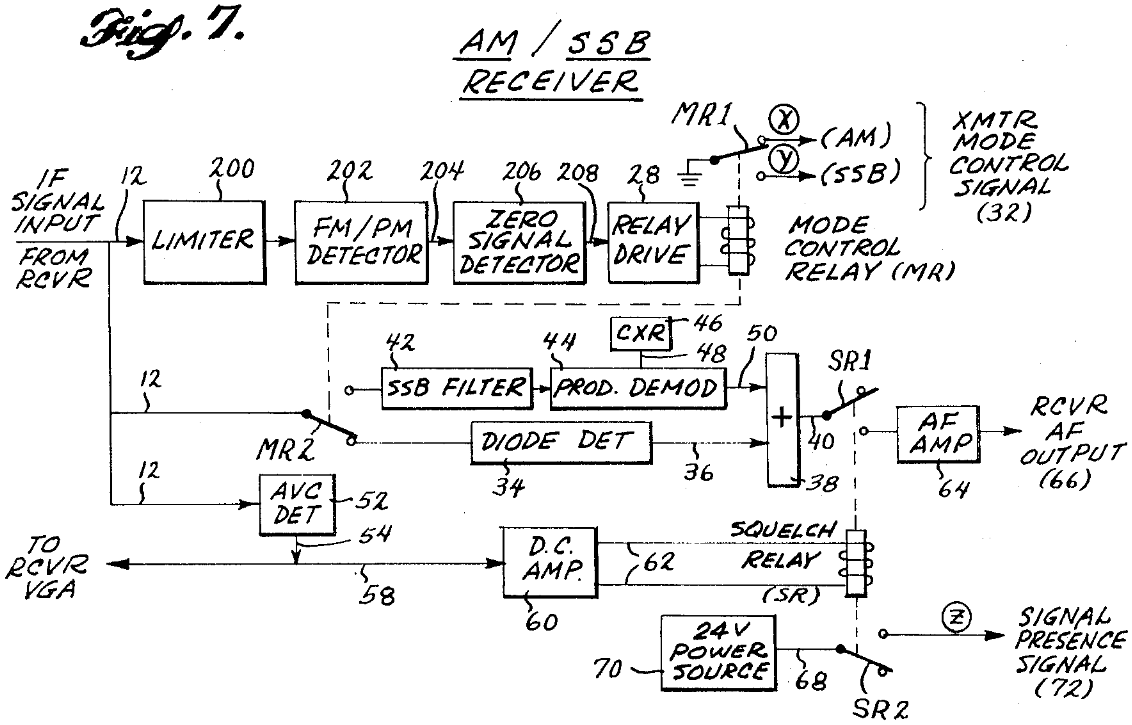
FIG. 7 is a further modified form of receiver typifying the present invention and designed to be differentially responsive to received signals having either amplitude modulation or single sideband modulation modes, the differentiation in this instance involving so-called zero signal detection as a means of sensing the modulation characteristic of the received signal.

FIG. 7 presents another modified form of receiver which illustrates an alternative technique of differentiating between an amplitude modulation type incoming signal and a single sideband type incoming signal. In the FIG. 7 circuit, the input signal 12 is fed to a limiter 200 and thence to FM/PM detector 202, the output 204 from which is in turn applied to a zero signal detector 206 to realize a control signal input 208 to relay drive 28. As known, a single sideband signal has a phase modulation component, whereas an amplitude modulation signal has no FM or PM modulation component. Thus, in the situation where the receive signal is of the single sideband type, the output 204 from the FM/PM detector 202 has a positive energy content so that the output 208 from the zero signal detector 206 in turn is positive and controls relay drive 28 to energize the mode control relay MR, establishing its respective contacts MR1 and MR2 in their energized positions. However, in the situation where the received signal is of the amplitude modulation type, the modulation characteristic sensing channel of the FIG. 7 circuit produces no output 204 from the FM/PM detector and no output 208 from the zero signal detector, so that relay drive 28 establishes or maintains mode control relay MR in its deenergized condition. Except for this variation in the manner of sensing the modulation mode of the received signal the FIG. 7 circuit will be seen to be otherwise identical to the receiver circuit shown at FIG. 1A.

In view of the foregoing, various further modifications and adaptations of the techniques and principles of the present invention will be apparent to those skilled in the art to which the invention is addressed. Thus, for example, composite circuitries involving multiple differentiation of diverse types of signal modulation modes can be realized by conjunctive utilization of the modulation mode sensing channels shown and discussed such as by combined use of peak and average detectors to differentiate amplitude modulation, single sideband and frequency modulation signals, or combined use of a peak and average detector signal channel with a zero signal detector signal channel. As will also be apparent, the mode control and memory circuitry shown in FIG. 1B can in some instances be eliminated, or other forms of circuits can be employed to retain a receive/transmit system in its last effective operating mode. Similarly, also, other techniques for transmitter control, other than by grounded control line can be employed with the various received signal modulation mode sensing and/or receive signal detection circuits presented.

I claim:

1. In a receiver/transmitter communications station equipped to receive and transmit signals of various modulation modes; the improvement comprising a receiver including means sensing the modulation mode of the last received signal and switching means for connecting selected demodulation circuitry to detect the signal, and associated transmitter means including said switching means adapted to provide the transmitted signal with circuitry which produces the same modulation mode as that of the last received signal.

2. In a communications system involving plural receive/transmit stations, at least some of which are equipped to receive and transmit signals with any one of various modes of signal modulation and wherein a station so equipped comprises; receiver means automatically sensing the modulation mode of a given received signal and switching means for connecting selected demodulation circuitry to detect the signal; transmitter means associated with said receiver means; said switching means also including connecting means for providing modulation circuitry for establishing the operating mode of the associated transmitter means to transmit signals in the modulation mode sensed by the receiver means.

3. A receiver/transmitter communications station, comprising receiver means capable of receiving signals having diverse modulation modes and having receiver detection circuitry for automatically sensing the modulation mode of each received signal and having switching means for responsively establishing and maintaining the operating mode of the receiver detection circuitry compatible with the modulation mode of the last received signal, said receiver means further comprising modulation means selected by the switching means for automatically generating a transmitter mode control signal responsive to the modulation mode of the last received signal, and said station further comprising transmitter means capable of transmitting in the diverse modes receivable by the receiver and controlled by said transmitter mode control signal to transmit a signal having the same modulation mode as the modulation mode of the last received signal.

4. A communications system including receiver means equipped to receive and detect a transmitted signal with a given modulation characteristic and also to receive and detect a transmitted signal with a different modulation characteristic, and wherein the system also includes transmitter means associated with said receiver means and equipped to transmit either a signal with such given modulation characteristic or to transmit a signal with such different modulation characteristic, said system comprising:

a. means in said receiver means for sensing the modulation characteristic of a received signal and responsively establishing detection circuitry of the receiver means to detect the received signal;
b. means in said receiver means generating a transmitter control signal responsive to the modulation characteristic of the received signal;
c. means in said receiver means responsive to the signal-to-noise ratio of the received signal and responsively generating a signal presence signal when the received signal has a signal-to-noise ratio of at least a predetermined value; and
d. means for controlling the operating mode of the associated transmitter means responsive to concurrence of said transmitter control signal and said signal presence signal.

5. In a communications receiver/transmission system equipped to receive and transmit either a single sideband type signal or an amplitude modulated type signal, the improvement wherein the receiver means of the system includes means sensing the modulation mode of the received signal and responsively applying the signal to compatible detection means, and also producing a compatible transmission mode control signal, such receiver means also comprising squelch control circuitry developing a signal presence signal having a predetermined control characteristic when the received signal has at least a predetermined signal-to-noise ratio; transmission mode control and memory circuitry controlled by said transmitter mode control signal and said signal presence signal and developing a first transmitter control output when the transmitter mode control signal and the signal presence signal indicates an effective signal of a first modulation mode is being received by the receiver means, and developing a second transmitter control output when the transmitter mode control signal and the signal presence signal indicates an effective signal of a second modulation mode is being received by the receiver means; and transmitter means controlled by such first and second transmitter control outputs to transmit a responding signal with the same modulation mode as that of the received signal.

6. A communications system according to claim 5, wherein the received signal modulation mode sensing means comprises peak detector means and average detector means, the outputs from which are fed to a comparison circuit which in turn produces a control signal selectively controlling receiver mode and transmitter mode controlling relay means.

7. A communications system according to claim 5, wherein said mode control and memory circuitry comprises plural relay means including double throw relay contacts, certain of which contacts provide interlock circuits for maintaining bistable relay energization conditions and by which each such relay upon being energized remains energized until energization of the other relay, and including other relay contacts selectively in circuit with associated transmitter means, the energization of one such relay being initiated by the concurrence of a signal presence signal and a transmitter mode control signal indicative of a received signal of a given modulation mode type, and the energization of a second such relay means being initiated by the concurrence of a signal presence signal and a transmitter mode control signal indicative of a received signal of another modulation mode type.

8. In a communications receiver equipped to receive and detect either a received signal having only amplitude modulation or a received signal having a modulation mode including a frequency modulation or a phase modulation component or characteristic; means applying a portion of the received signal to a modulation sensing channel comprising limiter means, FM/PM detector means, and a zero signal detector to develop a control signal for mode control relay means and establish such relay means in deenergized condition in the instance of the receive signal having only amplitude modulation and in an energized condition in the instance when the receive signal includes a frequency modulation or phase modulation component, said mode control relay means including control contact means applying another portion of the received signal to compatible detection means and also including other control contact means delivering a compatible transmitter mode control signal to associated transmitter means to render the modulation mode of the associated transmitter means compatible with that of the received signal.

9. A communications receiver according to claim 8, wherein said receiver further comprises squelch control circuitry responsive to the received signal and delivering receiver AF output only in the instance of the received signal having at least a predetermined signal-to-noise ratio 10. A communications system including receiver means equipped to receive and detect a transmitted signal with a given modulation characteristic and also to receive and detect a transmitted signal with a different modulation characteristic, wherein the system also includes transmitter means associated with said receiver means and equipped to transmit either a signal with such given modulation characteristic or to transmit a signal with such different modulation characteristic, said system comprising:

a. circuit means in said receiver means for sensing the modulation characteristic of a received signal and responsively establishing detection circuitry of the receiver means to detect the received signal;
b. circuit means in said receiver means which generates a transmitter control signal responsive to the modulation characteristic of the received signal; and
c. switching means for controlling the operating mode of the associated transmitter means responsive to concurrence of said transmitter control signal.